United States Patent [19]
Sorel et al.

[11] Patent Number: 5,121,399
[45] Date of Patent: Jun. 9, 1992

[54] DEVICE FOR CONTINUOUSLY TUNING A COHERENT AND RECTILINEARLY POLARIZED LIGHT SOURCE

[75] Inventors: Yvon Sorel, Perros-Guirec; Jean-Francois Kerdiles, Pleumeur-Bodou; Jean-Pierre Goedgebuer, Pouilley-les-Vignes; Henri Porte, Serre les Sapins, all of France

[73] Assignee: French State represented by the Minister of Post, Telecommunications, and Space (Centre National d'Etudes des Telecommunications), Issy Les, France

[21] Appl. No.: 612,537

[22] Filed: Nov. 13, 1990

[30] Foreign Application Priority Data
Nov. 15, 1989 [FR] France .................. 89 14979

[51] Int. Cl.[5] .................................................. H01S 3/10
[52] U.S. Cl. ........................................ 372/20; 372/33; 372/97; 372/105
[58] Field of Search .................. 372/20, 105, 33, 97

[56] References Cited

U.S. PATENT DOCUMENTS

| | | | |
|---|---|---|---|
| 4,803,692 | 2/1989 | Sakano et al. | 372/20 |
| 4,897,843 | 1/1990 | Scott | 372/20 |
| 4,975,918 | 12/1990 | Morton | 372/20 |

FOREIGN PATENT DOCUMENTS 2575613 12/1984 France .

OTHER PUBLICATIONS

Article by Heismann et al., published in Applied Physics Letters, vol. 51, No. 3, Jul. 20, 1987, pp. 164 to 166.
Article by C. Chappuis et al., published in Optics Communications, vol. 47, No. 1, Aug. 1, 1983, pp. 12 to 17.
Article by C. L. Tang et al., published in Applied Physics Letters, vol. 30, No. 2, Jan. 15, 1977, pp. 113 to 116.
Article by A. Schremer et al., published in Applied Physics Letters, vol. 55, No. 1, Jul. 3, 1989, pp. 19 to 21.
Article by J. M. Telle et al., published in Applied Physics Letters, vol. 24, No. 2, Jan. 15, 1974, pp. 85 to 87.

*Primary Examiner*—Georgia Y. Epps
*Attorney, Agent, or Firm*—Pearne, Gordon, McCoy & Granger

[57] ABSTRACT

Device able to continuously tune a coherent and rectilinearly polarized light source. It includes an electro-optical device (5) forming a spectral filter with an electrically modulable transfer function, this electro-optical device being provided so as to select a particular longitudinal mode from all the longitudinal modes able to oscillate inside the external cavity for which the source (1) is provided and which is ended by a reflecting device (3) towards the source of the light emitted by this source, and an electro-optical device (4) for varying the optical length of the cavity, this variation device being placed in the cavity and provided so as to continuously move the position of the selected longitudinal mode, each electro-optical device including a compact electro-optical crystal.

12 Claims, 9 Drawing Sheets

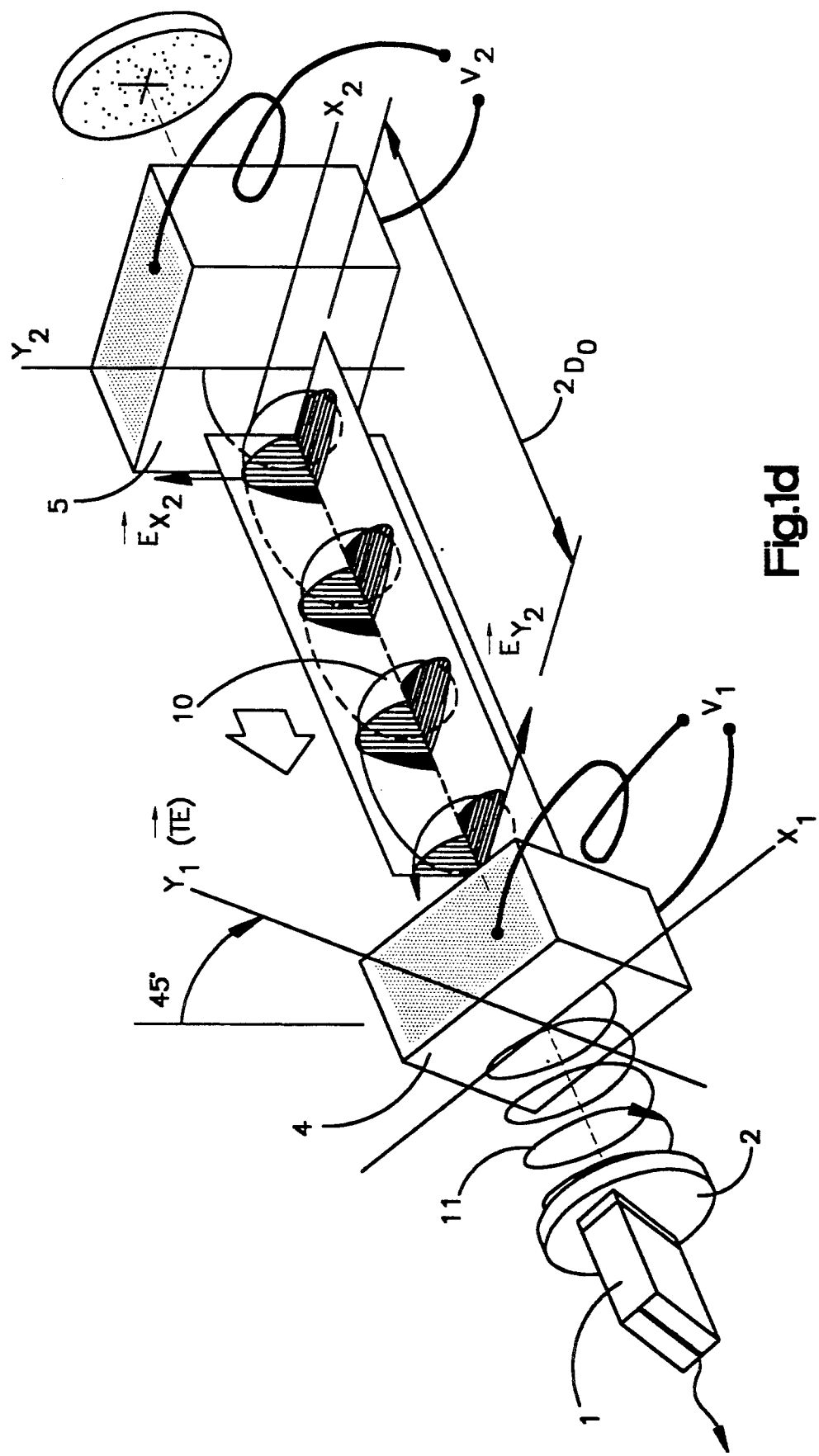

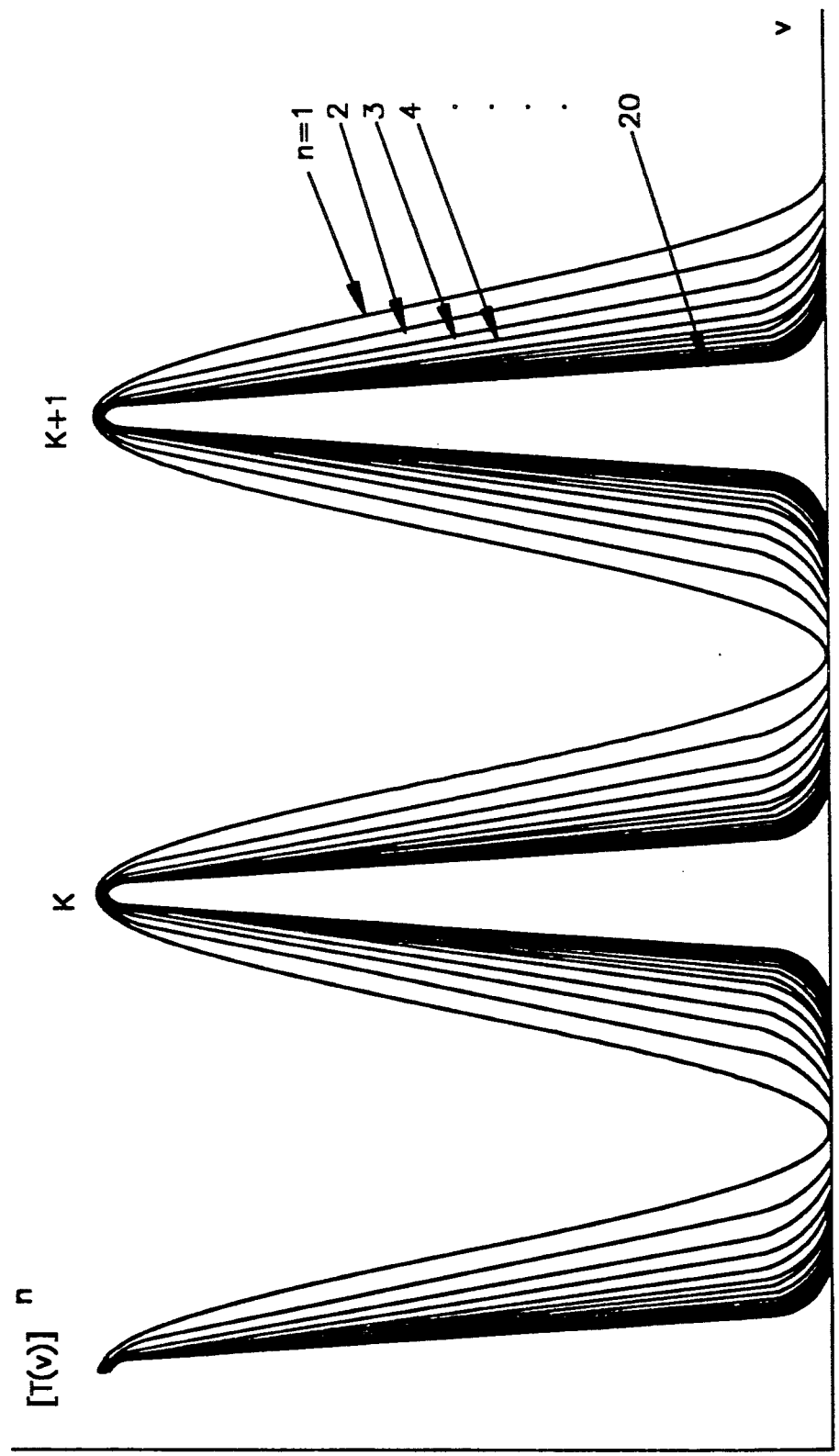

DEVICE FOR CONTINUOUSLY TUNING A COHERENT AND RECTILINEARLY POLARIZED LIGHT SOURCE

FIELD OF THE INVENTION

The present invention concerns a device able to continuously tune the emission frequency of a coherent and rectilnearly polarized light source. The device can be used in particular in optical telecommunications applications in which it makes it possible to obtain a coherent radiation tuneable, for example, around 1.52 micrometers of wavelength with a small spectral width of about 100 kHz.

BACKGROUND OF THE INVENTION

In the present invention, the light source is provided with an external cavity ended by a reflecting device towards the source of the light emitted by this source.

This source may be a laser, such as a gas laser whose cavity has been elongated.

The source may also be a semiconductor laser whose face, which is on the side of the reflecting device, is treated by a coating.

The device of the invention is then designed in such a way as to be inserted into the cavity of the semiconductor laser and makes it possible to continuously tune the emission frequency of this semiconductor laser on a plurality of spectral ranges which may cover the width of the spontaneous emission spectrum of the semiconductor laser.

One of the objectives sought in linkages by optical fibers is the tuneability of the emission frequency of sources (laser diodes) used in such linkages and in particular so as to overcome the problems of adjustment and the drift of the wavelengths of the sources. Thus, in wavelength multiplexing, the theoretically unlimited number of channels is, in practice, limited by the wavelength drifts of the laser diode and by the dispersion of the emission parameters of the laser diodes at the time these laser diodes are produced. Because of this, most wavelength multiplexed telecommunications systems are currently limited to about twelve channels between 800 nm and 1300 nm owing to the lack of reliable devices able to finely adjust the emission wavelength of the laser diodes.

The tuneability of the emission frequency of laser diodes also constitutes a key problem in long-distance optical coherent links. In this type of link, the frequency of the emitting source needs to be tuned to that of the local oscillator so as to carry out a demodulation by optical heterodyning. Similarly, in local multicolored networks, the optical multiplexing of several channels on a given network is effected by allocating to each channel a particular optical frequency with the aid of laser diodes locked onto predetermined frequencies.

At each end of the network, demultiplexing is carried out by heterodyning with the aid of a laser diode (behaving as a local oscillator) whose frequency the tuned to one of the bearer frequencies. The installing of monofrequency semiconductor lasers with a continuously tuneable frequency is therefore still essential for local networks with a high multiplexing density.

Other applications also require fine and continuous tuneability of the emission frequency of the laser diodes:

In optical metrology, certain measuring techniques implementing, for example, the "speckle" phenomena at several wavelengths use the phenomena of multiwavelength interference so as to determine the topography of a surface or the state of this surface.

In molecular spectroscopy, the analysis of the emission or absorption spectrum of molecules illuminated by a luminous wave with a rapidly variable frequency may yield information concerning their dynamic or transitory behaviour.

The use of a laser diode having a continuously tuneable emission wavelength has also recently been proposed for studying wavelength chaos, multistability and bistability phenomena (IEEE Journal of Quantum Electronics, 23, 2, 1987, pp. 153-157).

Generally speaking, the continuous tuneability of the emission frequency of a laser diode is obtained by modifying the current traversing the junction point of this laser diode or by modifying the temperature of the laser diode. However, the frequency drift thus obtained remains relatively small (several hundreds of MHz/mA and about 1GHz/°C.) and proves insufficient for the above-mentioned applications.

Another method consists of using a laser diode mounted in the external cavity inside which an optical grating is inserted. In this respect, reference may be made to the documents (1) to (4) which, like the other documents cited subsequently, are mentioned at the end of this description.

It is also possible to consult the document (5).

The documents (1) to (4) describe various devices for the continuous tuning of the frequency of the external cavity laser diodes. By means of rotation, a diffraction grid makes it possible to obtain a monofrequency emission (with a line width of several tens of kHz) tuneable over an extended (30 nm) spectral range centered on 1300 nm or 1500 nm.

Continuous tuneability is obtained by modifying the optical length of the external cavity simultaneously with rotation of the grating contained in this cavity. This modification of the optical length of the cavity is obtained by using either the travel of the grating (documents (1) and (2)) or by piezoelectric translation devices (document (4)) or even by modifying the current traversing the junction point pn of the laser diode (document (3)). However, for certain applications, these techniques are limited by virtue of their low tuning speed, their sensitivity to the mechanical adjustments or by them being unable to pass from one frequency to another without passing through intermediate frequencies.

A tuneability obtained electrically rather than mechanically is more advantageous as it makes it possible to overcome the preceding drawbacks. One solution consists of monolithically integrating the tuneability function on a DFB or DBR laser from electrically controlled laser structures with separate sections. By controlling the current in each of the sections, it is possible to obtain a tuneable monomode emission. Such systems require fine control of the injection currents and also require extremely elaborated technology in order to embody the films forming such structures, such as those described, for example, in the document (6). Continuous tuning ranges of 380 GHz have been recently obtained in a 1500 nm window with line widths of between 20 and 100 MHz.

Another known technique making it possible to obtain an electrically tuneable emission frequency consists of using an electro-optical modulator mounted in the cavity of an external cavity laser diode. This type of device is derived from wavelength tuneable devices with dye lasers described, for example, in the documents (7) to (11) and in which tuneability is effected by mode jumps.

Thus, the documents (10) and (11) describe an electro-optical tuning system comprising a KD P crystal with a 0° Z section inserted into the cavity of an external cavity laser diode and making it possible to obtain a tuning by mode jumps on a range of 4 nm in the 800 nm window by applying a voltage of 6 kV to the crystal.

Another known system making it possible to obtain a tuning by mode jumps is described in the document (12).

Another approach put forward in the document (13) consists of using an external cavity laser diode coupled to an electro-optical spectral filter integrated onto an LiNb0₃ substrate with a section X with propagation of the light along the axis Y. The electro-optical filter comprises a double set of electrodes. A first set of interdigitalized electrodes allows for tuning of the emission frequency by mode jumps on an extended range by introducing a selective coupling between the propagation modes TE and TM extending into an optical guide embodied by diffusing Titanium in the substrate. The second set of electrodes induces a phase modulation on the radiation extending into the guide so as to carry out continuous tuneability over a narrow range.

In this known device, a frequency tuning on a range of 7 nm centered on 1500 nm is embodied by mode jumps by applying a voltage of 100 volts to the first set of electrodes. Continuous tuneability is effected on a plurality of ranges of 1 GHz with a line width of 60 kHz for a wavelength cavity equal to 8 cm.

A further solution making it possible to electrically tune the frequency of an external cavity laser diode consists of using two acousto-optical cells placed in the cavity, as described in the document (14). The tuning range extends over 35 nm, is centered on 1500 nm, but is effected by mode jumps.

It is also possible to consult the document (15) as regards tuning with the aid of acousto-optical cells.

SUMMARY OF THE INVENTION

The object of the present invention is to overcome the drawback exhibited by known devices by using a compact crystal electro-optical modulator, namely of obtaining a tuning solely discontinuously by mode jumps.

The present invention concerns a device making it possible to continuously tune the emission frequency of a coherent and reclinearly polarized light source provided with an external cavity and in particular the emission frequency of an external cavity semiconductor laser over an extended spectral range able to reach the width of the spontaneous emission spectrum of the semiconductor laser.

To this effect, the device of the invention comprises, not merely one compact electro-optical crystal device making it possible to select one longitudinal mode from those able to oscillate inside the cavity, but also an electro-optical device for varying the optical length of this cavity, this second device including a compact electro-optical crystal being placed in the cavity and making it possible to continuously move the position of the selected longitudinal mode.

More specifically, the object of the present invention is to provide a device for tuning a coherent and rectilinearly polarized light source, this source comprising an external cavity ended by a reflecting device towards the source of the light emitted by this source, this device including an electro-optical device, itself including a compact electro-optical crystal, being placed in the external cavity and forms a spectral filter with an electrically modulable transfer function, this electro-optical device being provided so as to select a particular longitudinal mode from all those longitudinal modes able to oscillate inside the cavity, wherein it further includes an electro-optical device for varying the optical length of the cavity, this variation device, including a compact electro-optical crystal, being placed in the cavity and provided so as to continuously move the position of the selected longitudinal mode.

According to one first particular embodiment of the device of the invention, each of the fast and slow axes of the electro-optical crystal of the device forming a spectral filter form an angle of 45° with the polarization plane of the light derived from the source.

According to a second particular embodiment, the electro-optical device forming a spectral filter further includes a double refractive plate, the fast axis and slow axis of the double refractive plate is respectively parallel to the fast axis and the slow axis of the electro-optical crystal of this device forming a spectral filter and each of these axes forms an angle of 45° with the polarization plane of the light derived from the source.

This addition of the double refractive plate makes it possible to reduce the electric control voltage of the electro-optical device forming the spectral filter.

According to a third particular embodiment, each of the fast and slow axes of the electro-optical crystal of the device forming a spectral filter from an angle of 45° with the polarization plane of the light derived from the source and this crystal is able to be slanted with respect to the optical axis of the cavity.

Thus, it is possible to dispense with the double refractive plate.

In the present invention, the selection of a particular longitudinal mode and the variation of the optical length of the cavity are obtained with the aid of two compact electro-optical crystals (whose double refraction can be made to vary by applying an electric field). In fact, certain embodiments mentioned subsequently only use a single compact electro-optical crystal which is then common to the two electro-optical devices.

Thus, generally speaking, at least one compact electro-optical crystal is used as opposed to one integrated electro-optical device and thus it is possible to use a technique much simpler than the one used with the integrated optical device in the document (13) and which makes it possible to firstly eliminate the temperature drift problems inherent to integrated optical components, and secondly to eliminate the problems related to loss of propagation and coupling whilst advantageously obtaining threshold currents much weaker than those obtained with the integrated optical device described in the document (13).

Furthermore, in the device described in the document (13), there is only one single crystalline orientation and action is taken on the interdigitalized electrodes, whereas in the present invention, as shall be more readily understood subsequently, the two electro-optical devices respectively include double refractring crystals whose crystalline orientations are different and action is taken on these different orientations and also on the effect of two electric fields whose respective orientations are also different.

The use in the invention of an electro-optical device with a compact electro-optical crystal in order to vary the optical length of the cavity also exhibits the following advantage: it makes it possible to simply adjust the width of the spectral tuning range and the light emission characteristics according to the applications for which it is intended.

In the case where a semiconductor laser is used, these applications may be: the transmission of signals by optical frequency modulation at frequencies able to reach several hundreds of MHz, the wavelength multiplexing of signals in telecommunications or optical sensor applications, multicolored networks, coherent links, the dispersion measurements of optical fibers and, generally speaking, all those systems requiring a slow or fast tuneability of the emission frequency of semiconductor lasers.

One of the fast and slow axes of the electro-optical crystal of the device for varying the optical length of the cavity may be parallel to the polarization plane of the light derived from the source.

In one particular embodiment, the device of the invention includes in the cavity:
one double refractive plate, each of its fast and slow axes forming an angle of 45° with the polarization plane of the light derived from the source, and
one double refracting crystal whose double refraction is able to be modified by applying an electric field, one of whose fast and slow axes being parallel to the polarization plane of the light derived from the source and which comprises:
a first portion fitted with electrodes and provided to form the device for varying the optical length of the cavity, and
a second portion provided with electrodes making it possible to create an electric field perpendicular to the electric field able to be created by the electrodes of the first portion and which is provided to form, by cooperating with the double refractive plate, the electro-optical device forming the spectral filter.

This makes it possible to reduce the length of the cavity and thus increase the width of the spectral range on which continuous frequency tuning takes place.

In another particular embodiment resulting in an even shorter cavity, the device of the invention includes in the cavity:
one double refractive plate, each of whose fast and slow axes forms an angle of 45° with the polarization plane of the light derived from the source, and
one double refracting crystal whose double refraction is able to be modified by applying an electric field, one of whose fast and slow axes being parallel to the polarization plane of the light derived from the source and which bears a first pair of electrodes, as well as a second pair of electrodes making it possible to create an electric field perpendicular to the electric field able to be created by the electrodes of the first pair, this first pair of electrodes cooperating with the crystal so as to form the device for varying the optical length of the cavity and the second pair of electrodes cooperating with the crystal so as to form by cooperating with the double refractive plate a electro-optical device forming the spectral filter.

In the case where the device of the invention includes a double refractive plate, it may further include a device for slanting this double refractive plate with respect to the optical axis of the cavity.

This makes it possible to adjust the central frequency of the tuning ranges and tuning rates.

Finally, the device for reflecting the light emitted by the source may be a film suitably adapted to reflect this light and formed on the double refractive element which, in the cavity, is furthest from the source.

BRIEF DESCRIPTION OF THE DRAWINGS

The present invention shall be more readily understood from a reading of the following description of embodiment examples, given purely by way of explanation and being in no way restrictive, with reference to the accompanying drawings on which.

DETAILED DESCRIPTION OF THE PREFERRED EMBODIMENTS

Figure 1A:
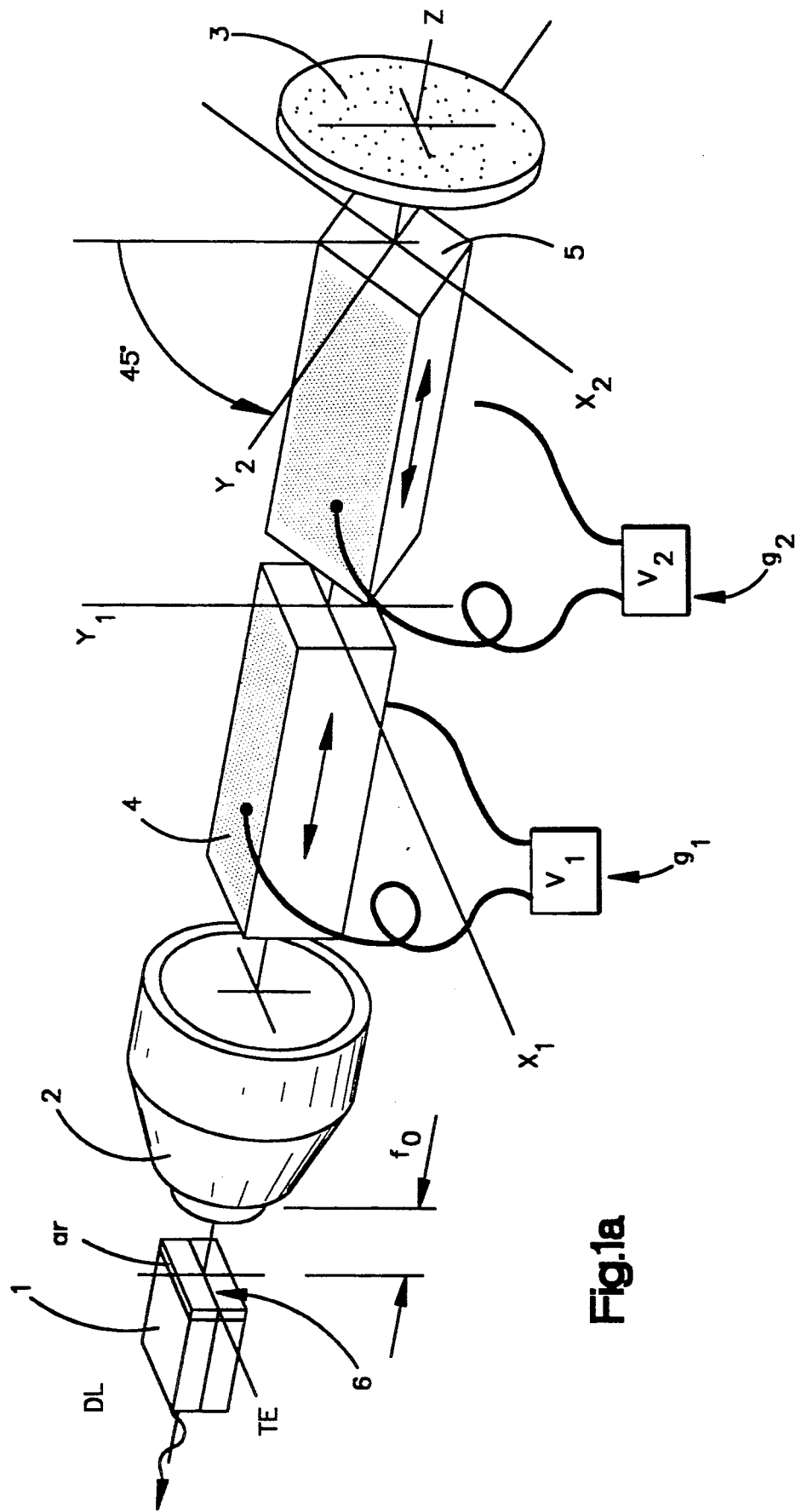
FIG. 1a is a diagrammatic view of a particular embodiment of the device of the invention for tuning an external cavity laser diode, FIGS. 1b to 1e diagrammatically illustrate the functioning of the device shown on FIG. 1a, FIG. 2 is a diagrammatic view of another particular embodiment of the device of the invention and comprising a double refractive plate.

The device of the invention shown diagrammatically on FIG. 1a is intended to continuously tune the emission frequency of an external cavity laser diode 1.

The laser diode 1 comprises a cleaved rear face with a reflection coefficient equal to about 0.3 and a front face treated by an anti-reflective coating ar and with a low reflection coefficient of about $10^{-4}$ (that is, practically speaking, between $5 \cdot 10^{-5}$ and $2 \cdot 10^{-4}$).

A collimation lens 2 is placed opposite the front face of the laser diode 1 and a mirror 3 is placed opposite this lens 2.

The device of the invention and shown on FIG. 1a includes a first element 4 of, for example, an electro-optical type, able to modify the optical length of the cavity, and a second element 5 which is an electro-optical spectral filter. These two elements 4 and 5 are placed inside the cavity between the lens 2 and the mirror 3.

The purpose of the lens 2 is to transform a divergent luminous beam derived from the front face of the laser diode 1 into a parallel beam which extends along the optical axis Z of the system shown on FIG. 1a (laser diode 1, lens 2, elements 4 and 5 and the mirror 3).

On FIG. 1a, the focal distance which separates the front face of the laser diode 1 from the collimation lens 2 is marked fo. In addition, this figure also shows that the optical axis Z is contained inside the plane of the junction point PN of the laser diode 1. This junction point bears the reference 6 on FIG. 1a.

The laser diode 1 emits a light which is rectilinearly polarized, the polarization plane TE (transverse/electric) being merged with the plane of the junction point 6.

The light, which is produced by the system shown on FIG. 1a and which is used for the selected application, is the one derived from the rear face of the laser diode 1.

The purpose of the mirror 3 is to reflect the light arriving at it from the laser diode 1 through the lens 2 and the elements 4 and 5 towards this laser dioide 1 (through the elements 4 and 5 and the lens 2).

It is to be noted that the faces of all the components (lens 2, elements 4 and 5 for FIG. 1a), which are situated in the external cavity of the laser diode 1, these faces being traversed by the light, are coated.

In the example shown on FIG. 1a, each of the elements 4 and 5 is formed by a single compact elongated electro-optical crystal along the optical axis Z. Each electro-optical crystal respectively bears, on two faces opposite each other with respect to the optical axis Z, two electrodes making it possible to generate in the corresponding crystal an electric field perpendicular to the axis Z when an electric voltage is applied between these two electrodes.

The electric voltage applied between the electrodes of the crystal is marked V1 and supplied by a suitable generator g1 able to vary this voltage V1. Similarly, the electric voltage applied between the electrodes of the crystal 5 is noted V2 and supplied by a suitable generator g2 making it possible to vary this voltage V2.

Thus, the elements 4 and 5 are controlled separately.

The crystals 4 and 5 are double refractive. The fast axis of the crystal 4 (respectively 5) is noted X1 (respectively X2) and the slow axis of this crystal 4 (respectively 5) is noted Y1 (respectively Y2).

The disposition of the crystal 4 is such that one of its fast and slow axes is orientated perpendicular to the polarization plane TE of the light emitted by the laser diode 1, the other of these fast and slow axes thus being parallel to this polarization plane.

The disposition of the crystal 5 is such that each of its fast and slow axes form an angle of 45° with the polarization plane TE, each of the axes X2 and Y2 thus forming an angle of 45° with the axis X1 and with the axis Y1.

Purely by way of illustration and being in no way restrictive, each of the crystals 4 and 5 is a crystal in the shape of a parallelpiped rectangle made of lithium niobate with a section of 0° Z and, in this case, the electrodes of the crystal 4 (respectively 5) are placed in such a way that the electric field generated in this crystal is parallel to the slow axis Y1 (respectively Y2) of said crystal.

There now follows an explanation of the functioning of the device represented on FIG. 1a by considering the two compact crystals 4 and 5, although these crystals may be replaced by a single compact crystal having a double electrode structure, as shall be seen subsequently.

The crystal 5 is intended to introduce, in the absence of any electric voltage between its electrodes (V2=0), a predetermined optical delay $D_0$ between the ordinary and extraordinary lines which traverse this crystal 5 along a single passage.

Figure 1B:
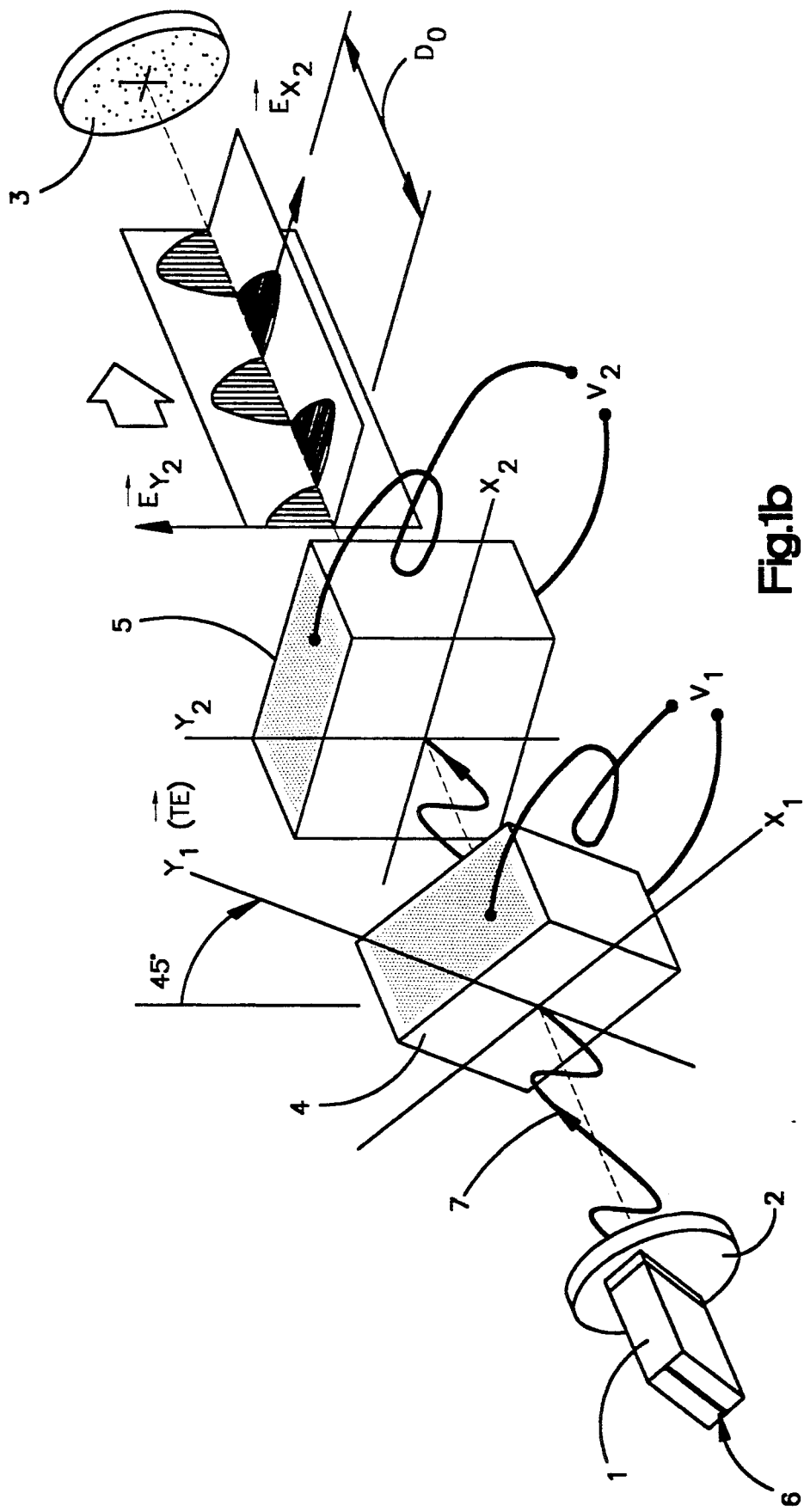

FIG. 1b shows what happens for an outward path (from left to right) of the light in the cavity. It shall be noted that on FIG. 1b, as also on FIGS. 1c and 1d, the drawing of the collimation lens 2 has been simplified and that it is the axis Y1 which is parallel to the plane of the junction point 6, whereas on FIG. 1a it is the axis X1 which is parallel to this plane of the junction point.

The luminous wave 7 is firstly emitted by the laser diode according to its propagation mode TE. The latter is linearly polarized in a plane parallel to the junction point 6 of the laser diode 1. With the crystal 4 having traversed the first by the wave 7 along its axis Y1, the latter does not modify the polarization state of the wave 7 and introduces a phase shift f to which reference shall be made subsequently.

By next traversing the crystal 5, the light is on the other hand vectorially split up along the two orthogonal axes X2 and Y2 into one ordinary field $E_{X2}$ and one extraordinary field $E_{Y2}$. The delay between these two fields is subsequently referred to as an "offset optical delay" and is noted $D_0$.

During the return path and after the second passage of the crystal 5, the delay between $E_{X2}$ and $E_{Y2}$ becomes $2D_0$, which corresponds to a phase shift $F=4pi \cdot D_0/l$ where l represents the wavelength of the light and pi is the well known number worth about 3.1416.

The value of this phase shift F determines the conditions for selecting the longitudinal modes of the cavity, this now to be explained in detail.

Figure 1C:
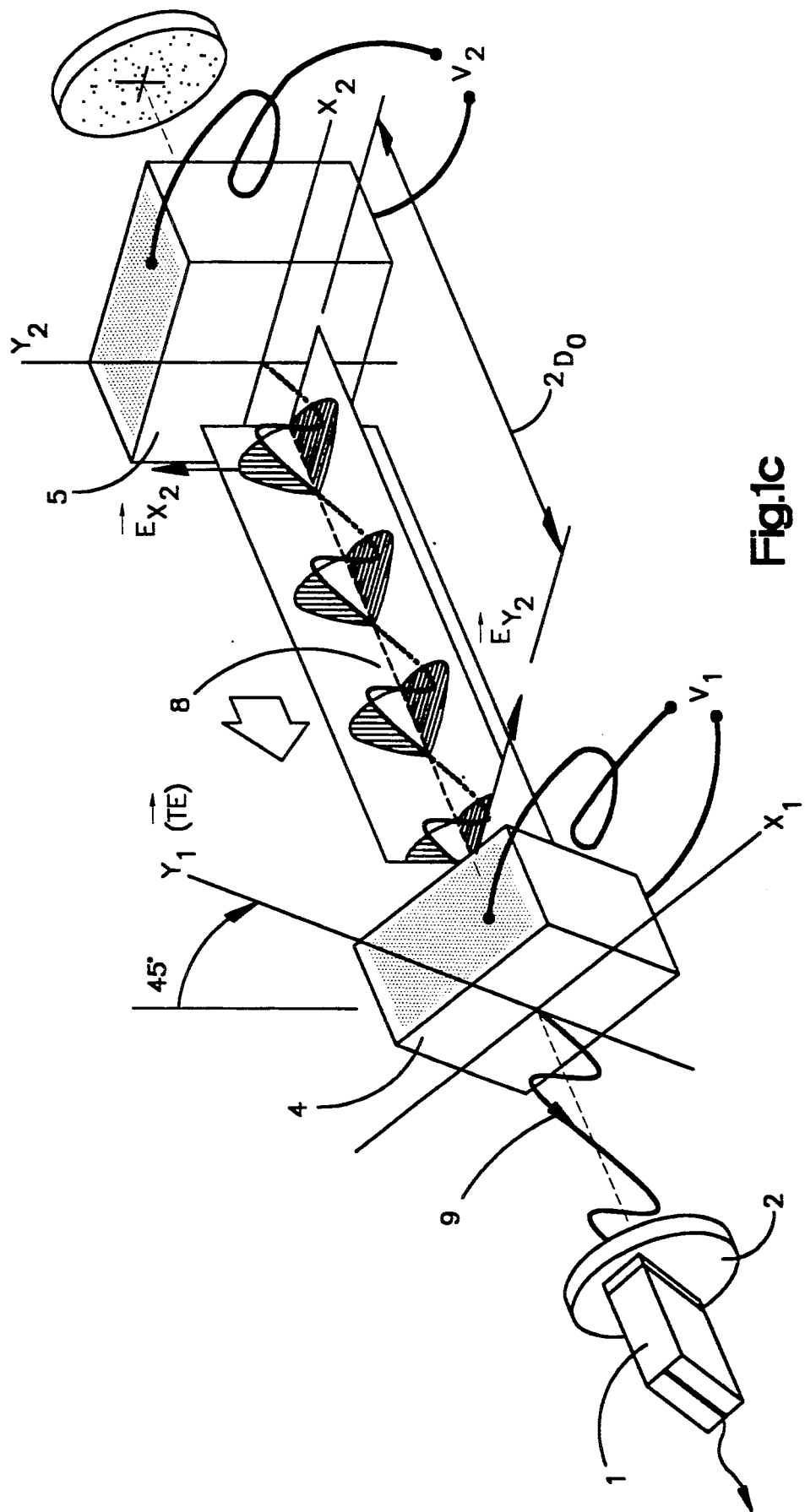

FIG. 1c shows the situation when $F=2K \cdot pi$ (K: whole number). The waves $E_{X2}$ and $E_{Y2}$ are then in phase. They yield a resultant wave 8 polarized linearly along the direction TE.

After the passage of the crystal 4, the polarization state of the wave 9 remains identical to that of the wave 8. The wave 9 is injected into the laser diode 1 with the aid of the lens 2. Then laser oscillation and stimulated emission is obtained in the cavity at the wavelength 1 for which the equation $F=2K \cdot pi$ is verified.

FIG. 1d shows the behaviour of a wave during the return path in the case where this concerns a longitudinal mode for which the equation $F=2K \cdot pi$ is not verified. The fields $E_{X2}$ and $E_{Y2}$ are still separated by the optical delay $2D_0$ but are no longer in phase. The resultant wave 10 is then an elliptically polarized wave.

On passage of the crystal 4, the wave 10 undergoes additional phase shifts. It yields a wave 11 whose polarization state, although different from that of the wave 10, remains generally elliptic. This wave 11 is then quickly attenuated by the propagation losses inside the laser diode 1. There is no laser emission.

Finally, the laser emission takes place on the longitudinal mode 1 simultaneously verifying:

$$F = 4pi \cdot D_0/l = 2K \cdot pi (K: \text{whole number}) \quad (1)$$

$$L = k \cdot \tfrac{1}{2} (k: \text{whole number}) \quad (2)$$

The equation (2) is the well-known resonance equation yielding the longitudinal modes able to oscillate inside a laser cavity with an optical length L.

The tuneability of the emission frequency is effected by applying an electric voltage V2 between the electrodes of the crystal 5. This voltage modulates the optical delay around the offset value $D_0$. The equation (1) then shows that any optical delay variation $dD_0$ is expressed by a linear variation dl of the emission wavelength according to the law:

$$dl = 2dD_0/K \quad (3)$$

Thus, a particular longitudinal mode is selected from all the longitudinal modes able to oscillate inside the cavity. This tuneability is effected by mode jumps. The value of the optical offset delay $D_0$ determines the tuneability parameters, now to be explained resorting to another approach involving physical phenomena.

This other approach, complementary to the previous approach, makes it possible to more readily understand how to select the optical offset delay $D_0$ and why the device makes it possible to obtain a monofrequency emission. This last point is a determining factor as regards the number of optical fiber telecommunications applications and in particular in coherent transmissions and multicolored networks.

According to the foregoing description, the junction point 6 of the laser diode 1 behaves as a polarizer for those waves extending inside the cavity. After a to-and-fro movement of the light in the cavity, the spectral selectivity introduced by the crystal 5 is thus described by the equation:

$$T(v) = 1 + \cos(2\pi \cdot (v/c) \cdot 2D_0) \qquad (4)$$

which is the well-known equation describing the spectral transmission curve according to the frequency v of a double refractive crystal placed between two parallel polarizers and introducing an optical delay $2D_0$ between its slow and fast axes, c being the speed of the light.

In fact, the situation is more complex. As the number n of transits of the luminous wave gradually increases in the cavity, the spectral selectivity of the crystal 5 becomes increasingly higher. Its spectral transmission curve becomes:

$$(T(v))^n = (1 + \cos(2\pi \cdot (v/c) \cdot 2D_0))^n \qquad (5).$$

FIG. 1e shows the evolution of the spectral transmission curve $(T(v))^n$. The fineness of the transmission peaks increases in proportion as n increases. Generally speaking, this explains that the laser emission obtained by this method is a monofrequency emission, the selectivity of the filter increasing with the number of to-and-fro movements of the light inside the cavity.

The various transmission peaks are situated at the frequencies v so that:

$$v = c \cdot K/(2D_0) \text{ (K: whole number)} \qquad (6).$$

The equation (6) is identical to the equation (1). The whole number K here represents the sequence number of the transmission peak. The distance between two transmission peaks is:

$$dv' = c/(2D_0) \qquad (7).$$

The choice of the value of the optical delay $D_0$ determines the functioning conditions of the crystal 5. The best conditions for functioning are obtained when the distance dv' between two adjacent transmission peaks is greater than or roughly equal to the width dv of the "scanning spectral range". According to the equations (6) and (7), this distance is approximately effected when D slightly differs from 0.5 $1^2/dl$ (equation (8)), a quantity in which 1 is the average emission wavelength and dl is the spectral width of the "tuning range" (the range it is desired to scan continuously).

By applying the voltage V2 to the crystal 5, the optical offset delay given by the equation (8) is slightly modified and has the effect of modulating the optical delay around this offset value $D_0$. The laser diode shall thus change longitudinal mode and start to oscillate on one of the other modes of the external cavity. Tuneability is effected by mode jumps.

Differing from the crystal 5, the crystal 4 is orientated so that one of its slow and fast axes is parallel to the plane of the junction point 6 of the laser diode 1 (FIG. 1a). The effect of the crystal 4 is to introduce an optical path e onto a wave TE traversing it, that is a phase delay able to be modulated via the Pockels effect by the control voltage V1.

By traversing the crystal 4 and after a to-and-fro movement inside the cavity, the longitudinal mode 1, which has been selected by the crystal 5 as described earlier, remains linearly polarized along the direction TE but undergoes a phase shift equal to 2f. This is able to be modulated via the Pockels effect by the control voltage V1. The effect of this voltage is to modify the optical length L of the cavity by a quantity dL and to induce a continuous tuning of the wavelength of the mode selected by the crystal 5 in accordance with the law:

$$dL = 2dL/k.$$

The maximum width of the continuous tuning ranges thus obtained is $dv = c/(2L)$. It is fully passed through when the element 4 induces an optical path variation $dL = \frac{1}{2}$.

The conditions for functioning of the two elements 4 and 5 are now to be illustrated by an example in which an InGaAsP/InP laser diode is used with a wavelength $l = 1500$ nm ($v = 2 \cdot 10^{14}$ Hz) tuneable over a range $dl = 20$ nm ($dv = 2.6 \times 10^{12}$ Hz).

The equation (8) shows that the optical offset delay shall be about 57 micrometers. The tuneability by mode jumps on the range $dl = 20$ nm is effected by varying the optical delay of a quantity $\pm D_0 \cdot dl/l = \pm 0.75$ micrometers (namely $\pm \frac{1}{2}$), that is by $\pm 0.38$ micrometers (namely $\pm \frac{1}{4}$) around the offset value. This is effected by applying the control voltage V2 between the electrodes of the crystal 5. The value of the control voltage V2 is determined by the half-wave voltage $V_{pi}$ of the crystal and thus depends on the type of crystal used.

Once the crystal 5 has enabled a given longitudinal mode to be selected from all the modes of the external cavity, the crystal 4 makes it possible to continuously tune the emission frequency around the selected longitudinal mode. This is effected by applying the voltage V1 to the crystal 4. The maximum width of the range on which continuous tuning is possible is equal to the width of one intermodal interval.

For example, if the optical length of the cavity is $L = 10$ cm, the frequency drift is possible without any mode jump on a wide range of $dv = c/(2L) = 1.5$ GHz. The optical delay variation introduced by the crystal 4 is then $dL = L \cdot dv/v = \frac{1}{2} = 0.7$ micrometers.

Crystals with a particular configuration make it possible to optimize the compactness of the cavity, as shall be explained subsequently, and thus obtain continuous tuning ranges whose width may range up to about ten GHz.

Figure 2:
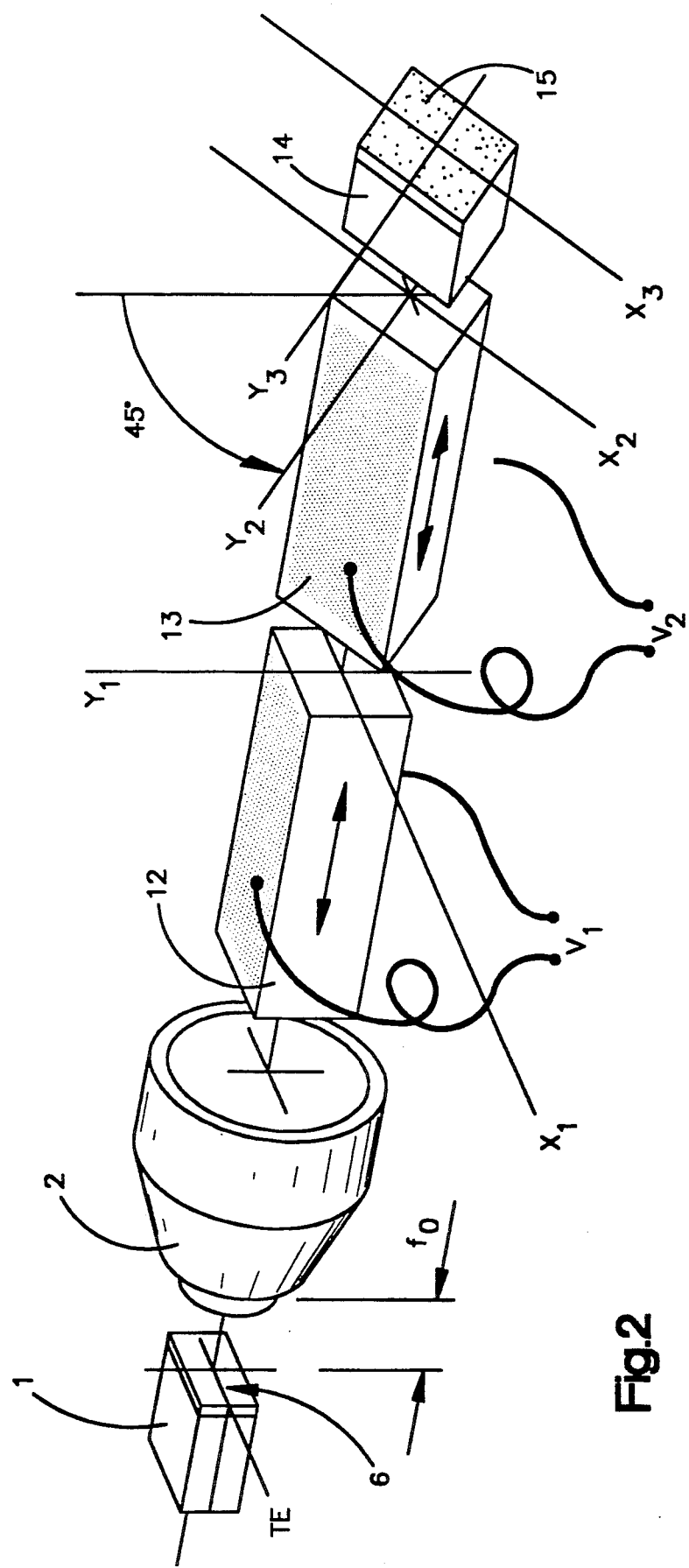

FIG. 2 diagrammatically shows a device conforming to the invention, which differs from the one shown on FIG. 1a by the fact that the mirror 3 is suppressed and that the device of FIG. 2 comprises in addition a crystal 12, similar to the crystal 4, and a crystal 13, similar to the crystal 5, a double refractive plate 14 which is placed on the path of the light in the section of the cavity furthest from the laser diode 1, and which bears a film 15 able to reflect the light, this light thus spreading towards the laser diode 1 through the crystals 13 and 12 and the lens 2. The film 15 here plays the role of an extremity mirror of the cavity, the light needing the traverse the plate 14 before arriving at the mirror.

Of course, instead of the film 15, it is possible to use a mirror of the type of the mirror 3 separated from the components of the cavity and ending the latter.

The crystals 12 and 13 are crystals made of $LiNbO_3$ with a section of 0° Z. Each of these crystals bears, as in the case of FIG. 1a, a pair of electrodes making it possible to induce an electric field orientated along the crystallographic axis y of this crystal (slow axis).

The crystal 12, with one of its axes (fast X1 or slow Y1) being orientated parallel to the plane of the junction point 6 of the laser diode 1, behaves as a phase modulator making it possible to obtain a continuous tuneability.

The crystal 13 is orientated so that its fast X2 and slow Y2 axes form an angle of 45° with the polarization plane of the light derived from the laser diode 1 and thus an angle of 45° with the axes X1 and Y1.

This crystal 13 electrically induces an optical delay able to be modulated by the voltage V2 applied between the electrodes of the crystal 13. This crystal is superimposed on the optical offset delay $D_0$ generated by the double refractive plate 14 whose fast axis X3 and slow axis Y3 are respectively parallel to the fast axis X2 and slow axis Y2 of the crystal 13.

The voltage V2 makes it possible to obtain a tuning by mode jumps, whereas the voltage V1 applied between the electrodes of the crystal 12 makes it possible to continuously tune the emission frequency of the laser diode 1.

By way of illustration and being in no way restrictive, the crystals 12 and 13 made of $LiNbO_3$ are used with a 2 mm opening (that is admitting a luminous beam 2 mm in diameter) and 10 mm long, as well as a calcite double refractive plate 14 with a thickness of 0.6 mm which introduces an optical delay $D_0$ equal to 57 micrometers; this makes it possible to embody a cavity with a length of 35 mm corresponding to an optical length of about 65 mm and to a free spectral range ISL of 2.3 GHz; the mode jump turning rate is then about 0.2 GHz/volts and the continuous tuning rate is about 1.2 MHz/volts; the continuous tuning ranges have a width of 2.3 GHz.

Figure 3:
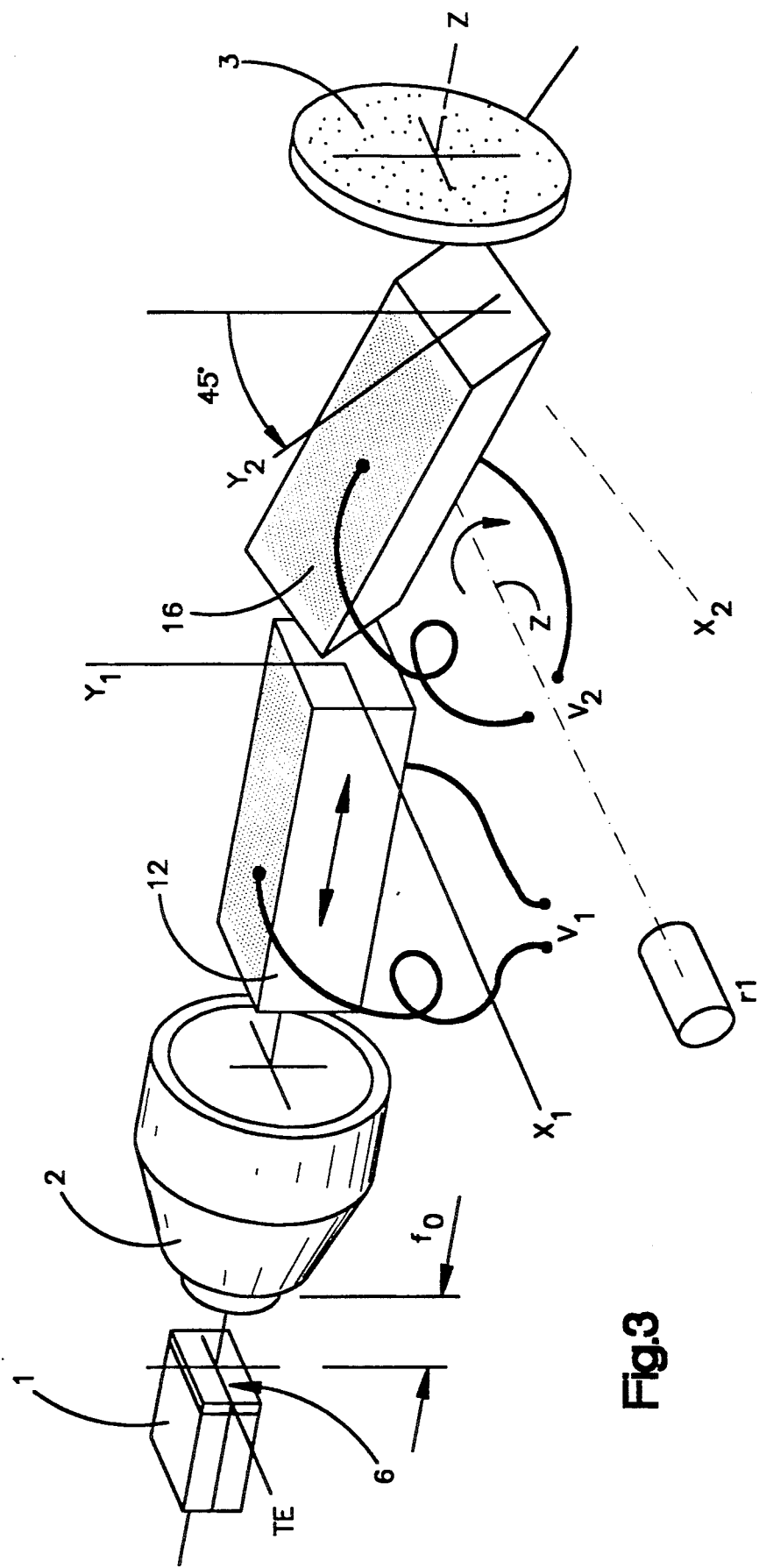
FIG. 3 is a diagrammatic view of another particular embodiment and comprising a slantable electro-optical component.

FIG. 3 diagrammatically shows another device conforming to the invention and which differs from the one shown on FIG. 2 by the fact that the device of FIG. 3 does not include any double refractive plate 14 provided with a reflective film 15, but, on the other hand, comprises a device r1 for slanting the crystal 13 around an axis t which is, for example, and without being restrictive, parallel to the axis X1 and situated inside the plane defined by the axes X1 and Z (polarization plane of the light derived from the laser diode 1), the crystal 13 bearing on FIG. 3 the reference 16. The slanting may be about ten degrees for a $LiNbO_3$ crystal 16 with a section of 0° Z. This slanting makes it possible to obtain the optical offset delay $D_0$.

The slanting device r1 is, for example, a micrometric rotating device on which the crystal 16 is mounted.

The device shown on FIG. 3, compared with the device shown on FIG. 2, has the advantage of allowing for reduction of the number of components and adjustment of the optical offset delay $D_0$ (by slanting the crystal 16). On the other hand, the crystal 16 requires a larger opening than that of the crystal 13 of FIG. 2, this opening of the crystal 16 being about 10 mm, such a larger opening involving a higher control voltage V2.

Figure 4:
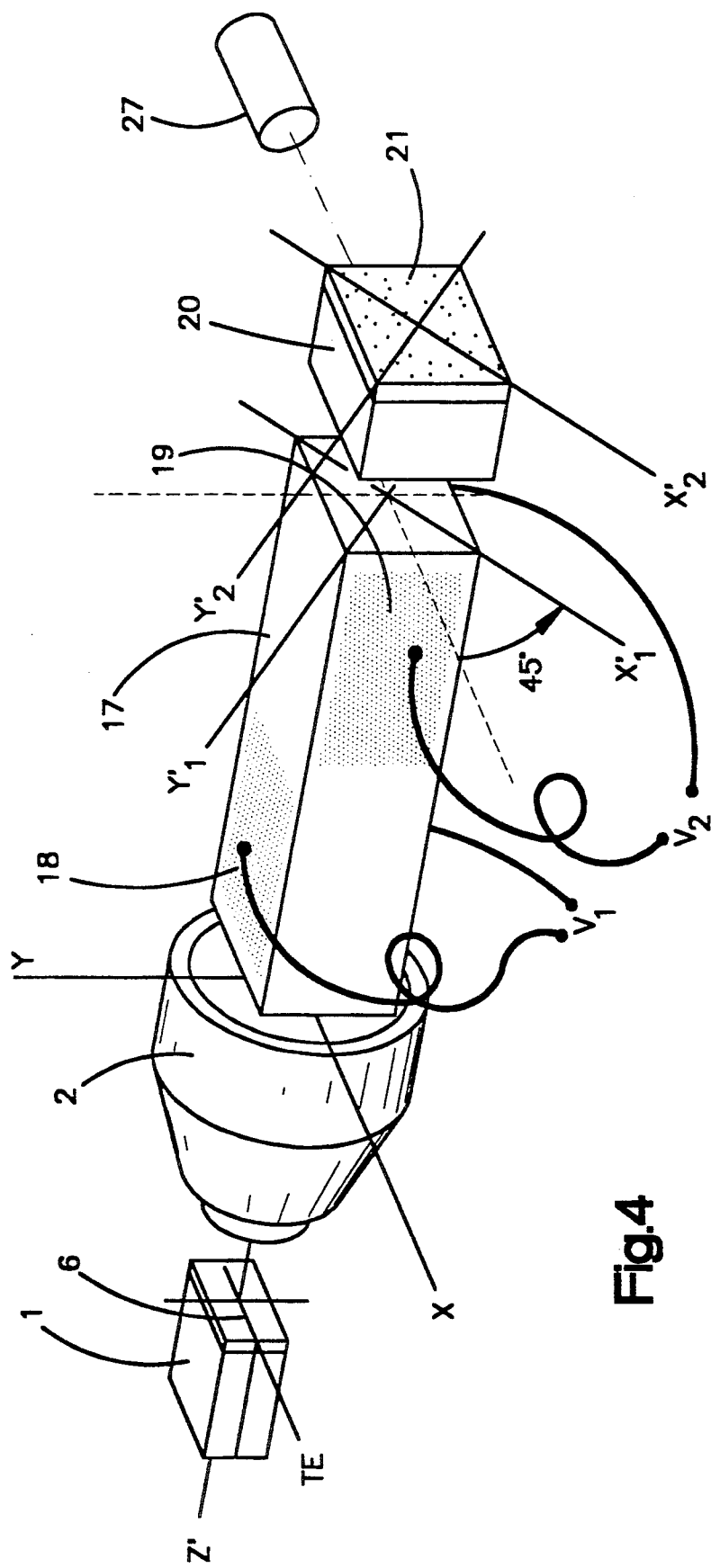
FIG. 4 is a diagrammatic view of a device according to the invention and comprising a double refractive crystal provided with two pairs of electrodes longitudinally offset with respect to one another.

FIG. 4 diagrammatically shows another device conforming to the invention and which includes, following the collimation lens 2, a single $LiNbO_3$ crystal 17 with a section 0° Z followed by a double refractive plate 20, the face of this plate furthest from the laser diode 1 being coated with a film able to reflect the light of the source.

The crystal 17 has an elongated shape along the optical axis Z and one portion of this crystal bears two electrodes 18 which are opposite each other with respect to the axis Z and provided so as to create an electric field parallel to the slow axis Y of the crystal 17 when an electric voltage V1 is applied between these electrodes 18.

The remaining portion of the crystal 17 bears two electrodes 19 which are opposite each other with respect to the axis Z and provided so as to create an electric field parallel to the fast axis X of the crystal 17 when an electric voltage V2 is applied between these electrodes 19.

FIG. 4 shows that the faces of the crystal 17, (parallelpiped crystal in the example shown) which respectively bear the electrodes 18, are perpendicular to the faces of the crystal 17, these faces respectively bearing the electrodes 19. The figure also shows that the system of electrodes 18 is offset with respect to the system of electrodes 19.

The crystal 17 is orientated so that one of its fast axes X and slow axes Y is parallel to the plane of the junction point 6 of the laser diode 1.

The first system of electrodes 18 induces an electric field which is oriented along Y and which has the effect of inducing a phase modulation proportional to the voltage V1 for the wave TE emitted by the laser diode 1.

The second system of electrodes 19 induces an electric field which is orientated along X and under the effect of which the axes X and Y of the crystal undergo a rotation of 45° so as to respectively come on X1' and Y1. The portion or section of the crystal, which bears the electrodes 19, then induces an optical delay between the axes X1' and Y1' able to modulated by the electric voltage V2.

The double refractive plate 20, whose fast X2' and slow Y2' axes are respectively parallel to X1' and Y1', induce the optical offset delay $D_0$.

The tuning device shown on FIG. 4 makes it possible to obtain a compact cavity and thus increase the width of the spectral range on which continuous tuneability takes place.

An embodiment example is given hereafter purely by way of illustration being in no way restrictive in the case of an InGaAsP/InP laser diode emitting to 1500 nm: a crystal 17 with an opening of 2 mm and comprising two systems of electrodes 18 and 19 with respective lengths of 28 mm and 2 mm and a calcite double refractive plate 20 with a thickness of 600 micrometers make it possible to obtain a cavity optical length of about L=75 mm, having regard to the spatial requirement of the collimation lens 2, which may be a spherical lens of a SELFOC type lens with a focal length of 0.3 mm and being 5 mm long; in these circumstances, the tuning rate by mode jumps is equal to 0.2 GHz/volts and the continuous tuning rate is equal to 3 MHz/volts with a continuous tuning range width of about 2 GHz.

Figure 5:
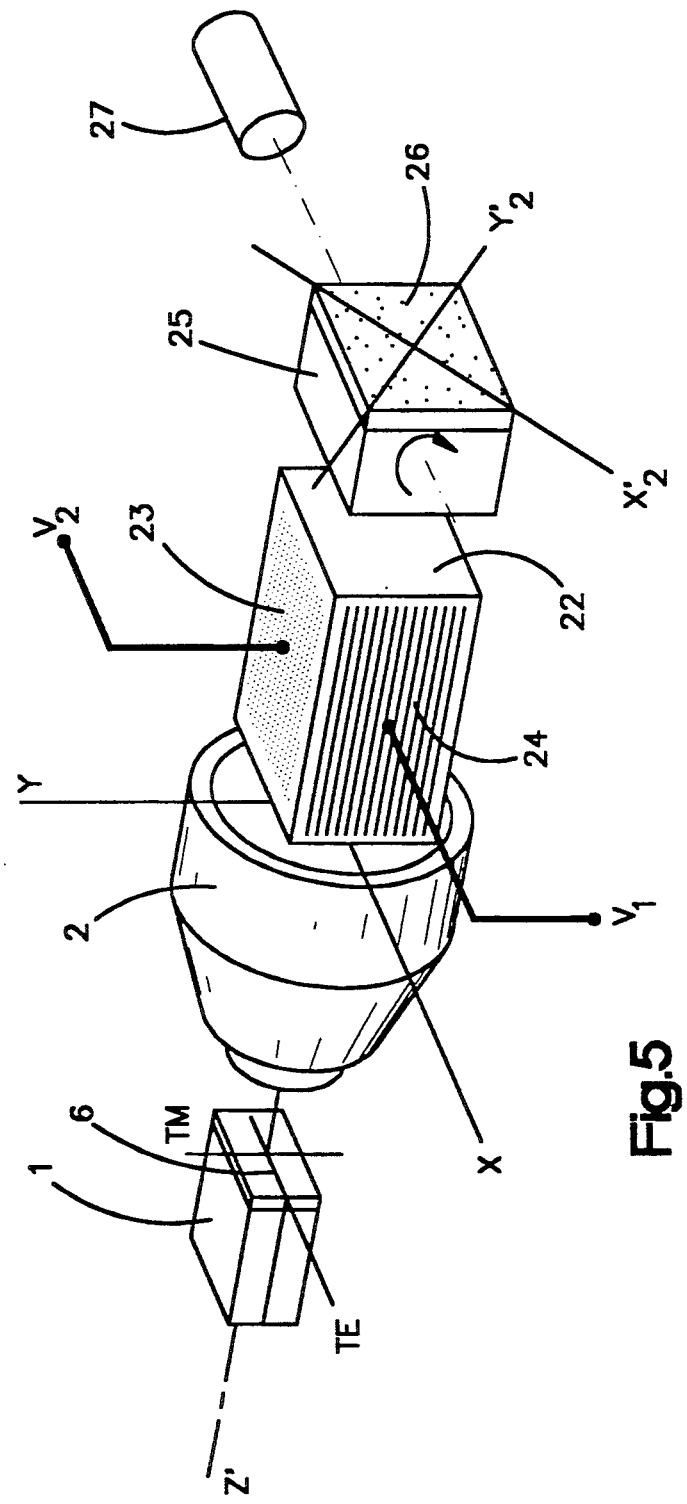
FIG. 5 is a diagrammatic view of another device according to the invention and comprising a double refractive crystal provided with two pairs of electrodes not offset with respect to one another, and FIG. 6 diagrammatically illustrates a device according to the invention for tuning the emission frequency of a gas laser.

In one embodiment variant diagrammatically shown on FIG. 5, the crystal 17 comprising two longitudinally offset systems of electrodes is replaced by an LiNbO$_3$ crystal 22 with a section 0° Z which is provided with a double system of non-offset electrodes 23 and 24 orthogonal with respect to one another.

More precisely, the crystal 22 with a parallelpiped shape bears two electrodes 23 which are respectively placed on two faces opposing each other with respect to the optical axis Z and provided so as to create (by applying an electric voltage V1 between them) an electric field parallel to the slow axis Y of the crystal 22. This crystal also bears two electrodes 24 respectively placed on its other two faces opposite each other with respect to the axis Z and provided so as to create (by applying an electric voltage between them) an electric field parallel to the fast axis X of the crystal 22.

The plate 20 and the reflective film 21 of FIG. 4 respectively bear the references 25 and 26 on FIG. 5.

The fast axis X of the crystal 22 is parallel to the junction point 6 of the laser diode 1. Tuning is effected by mode jumps with the aid of the voltage V2 applied between the electrodes 24 and continuous tuning is induced with the aid of the voltage V1 applied between the electrodes 23.

The double refractive plate 25, on which the reflective film 26 is deposited, introduces the optical offset delay D$_0$.

The configuration of FIG. 5 makes it possible to obtain greater compactness than that of the devices of FIGS. 1a, 2, 3 and 4. The optical length of the cavity may be reduced to less than 20 mm, which gives a continuous tuning range which may reach 8 GHz, whilst ensuring improved stability of the emission frequency than in the preceding cases.

For all the devices described with reference to FIGS. 1a, 2, 3, 4 and 5, the various components of these devices (two crystals or two crystals plus one double refractive plate or one crystal plus one double refractive plate) may be used in any order, it being understood that the device for reflecting the light (mirror 3 or reflective film) needs to always be placed at the extremity of the cavity (on the component furthest from the laser diode 1 when this reflective device is a reflective film).

Moreover, in the case where the device comprises a double refractive plate (FIGS. 2, 4 and 5), this plate may be mounted on a slanting device 27 (FIGS. 4 and 5) able to slant the plate via rotation around an axis which is perpendicular to Z and, without this being restrictive, is situated in the polarization plane TE, for example, so as to obtain an adjustment of the optical offset delay D$_0$ and thus modify the central frequency of the tuning ranges or tuning rates.

In this case, the reflective film is preferably deposited on one of the crystals used (or the crystal used) rather than on the double refractive plate so as to preserve the optical alignment of the cavity, this plate then being placed in an intermediate position in the cavity so that it is the crystal which is then most distant from the laser diode 1.

In order to vary the optical length of the cavity, means other than an electro-optical device are used: it is possible to use a piezoelectric type device secured to the mirror 3 or, when a reflective film is used instead of such a mirror, secured to the reflective film the component of the cavity comprises which is most distant from the laser diode 1, such a piezoelectric device being acceptable in cases not requiring an extremely fast tuning of the emission frequency of the laser diode 1.

Furthermore, the present invention is not merely restricted to a use with a laser diode. This is diagrammatically shown on FIG. 6 where a device conforming to the invention makes it possible to continuously tune the emission frequency of, for example, a gas laser, such as a He-Ne laser which has been modified so as to elongate its cavity.

Figure 6:
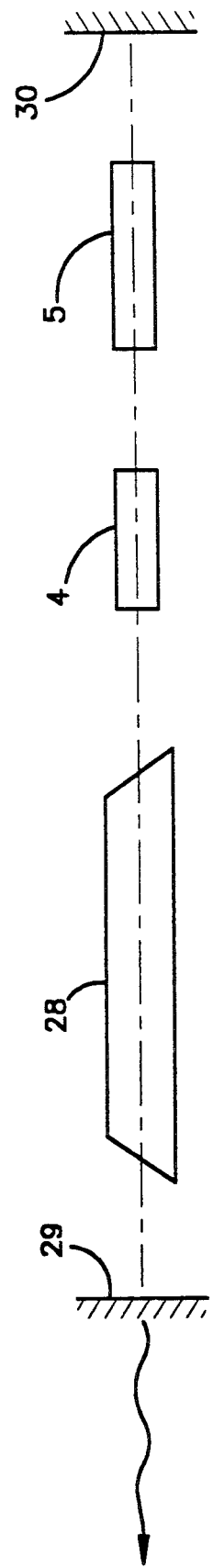

FIG. 6 shows the tube 28 of the gas laser with its Brewster faces, as well as a partially transparent mirror 29 of this laser through which one part of the light, produced by the system of FIG. 6, passes, namely the part which is used for the desired application of the system.

The other mirror 30, namely a total reflector of the gas laser, is offset: it is distanced from the tube 28 so as to be able to insert between them the device of the invention. Thus, between the tube 28 and the mirror 30, the elements 4 and 5 are inserted, these elements being of the type of those shown on FIG. 1a and which are suitably disposed (as explained in the description of FIG. 1a) with respect to the polarization plane of the light derived from the tube 28.

DOCUMENTS REFERRED TO (1) F. FAVRE and al., Electronics Letters, vol. 22, No 15, 1986, p. 795-796
(2) French patent application No. 8602504 of Feb. 24, 1986
(3) B. GLANCE and al., Electronics Letters, vol. 23, No 3, 1987, p. 98-99
(4) N. A. OLSSON and al., IEEE Journal of Lightwave Technology, vol. LT-5, No 4, April 1987, p. 510-515
(5) W. V. SORIN and al., Electronics Letters, vol. 23, No 8, 1987, p. 390-391
(6) K. KOBAYASHI and al., IEEE Journal of Lightwave Technology, vol. 6, No 11, Nov. 1988, p. 1623-1633
(7) J. M. TELLE and al., Applied Physics Letters, vol. 24, No 2, Jan. 15, 1974, p. 85-87
(8) C. CHAPUIS and al., Optics Communications, vol. 47, No 1, Aug. 1983, p. 12-17
(9) French patent application, No. 8419861 of Dec. 27, 1984
(10) C. L. TANG and al., Applied Physics Letters, vol. 30, No 2, Jan. 15, 1977, p. 113-116
(11) A. OLSSON and al., IEEE Journal of Quantum Electronics, vol. QE-15, No 10, October 1979, p. 1085-1088
(12) A. SCHREMER and al., Applied Physics Letters 55 (1), Jul. 3, 1989, p. 19-21
(13) F. HEISMANN and al., Applied Physics Letters, 51(3), Jul. 20, 1987, p. 164-166
(14) G. A. COQUIN and al., Electronics Letters, vol. 24, No 10, May 12, 1988, p. 599-600
(15) G. COQUIN and al., "Single—and Multiple—Wavelength Operation of Acoustooptically Tuned Semiconductor Lasers at 1.3 micrometers", IEEE Journal of Quantum Electronics, vol. 25, No 6, June 1989.

What is claimed is:

1. Device for tuning a coherent and rectilinearly polarized light source, this source comprising an external cavity ended by a reflecting means for reflecting towards the source the light emitted by this source, this device including an electro-optical means, which includes a bulk electro-optical crystal, is placed in the external cavity and forms a spectral filter having an electrically modulable transfer function, this electro-optical means being provided so as to select a particular longitudinal mode from all the longitudinal modes able to oscillate inside the cavity, wherein said device further includes an electro-optical means for varying the optical length of the cavity, this variation means including a bulk electro-optical crystal and being placed in the cavity and provided to continuously move the position of the selected longitudinal mode.

2. Device according to claim 1, wherein each of the fast and slow axes of the electro-optical crystal of the means forming a spectral filter forms an angle of 45° with the polarization plane of the light derived from the source.

3. Device according to claim 1, wherein the electro-optical means forming a spectral filter further includes a birefringent plate, wherein the fast axis and slow axis of the birefringent plate are respectively parallel to the fast axis and the slow axis of the electro-optical crystal of this means forming a spectral filter and wherein each of these axes forms an angle of 45° with the polarization plane of the light derived from the source.

4. Device according to claim 1, wherein each of the fast and slow axes of the electro-optical crystal of the means forming a spectral filter form an angle of 45° with the polarization plane of the light derived from the source and wherein this crystal is able to be slanted with respect to the optical axis of the cavity.

5. Device according to claim 1, wherein one of the fast and slow axes of the electro-optical crystal of the means for varying the optical length of the cavity is parallel to the polarization plane of the light derived from the source.

6. Device according to claim 1, wherein it includes in the cavity:
one birefringent plate, each of whose fast and slow axes form an angle of 45° with the polarization plane of the light derived from the source, and
one birefringent crystal whose birefringent is able to be modified by applying an electric field, one of the fast and slow axes of said one birefringent crystal being parallel to the polarization plane of the light derived from the source, and which comprises:
one first portion provided with electrodes and provided to form the means for varying the optical length of the cavity, and
a second portion which is provided with electrodes making it possible to create an electric field perpendicular to the electric field able to be created by the electrodes of the first portion and which is provided so as to form in cooperation with the birefringent plate the electro-optical means forming the spectral filter.

7. Device according to claim 1, wherein it includes in the cavity:
one birefringent plate, each of whose fast and slow axes form an angle of 45° with the polarization plane of the light derived from the source, and
one birefringent crystal whose birefringence is able to be modified by applying an electric field, on of the fast and slow axes of said one birefringent crystal being parallel to the polarization plane of the light derived from the source, and which bears a first pair of electrodes, as well as a second pair of electrodes making it possible to create an electric field perpendicular to the electric field able to be created by the first pair of electrodes, this first pair of electrodes cooperating with the crystal so as to form the means for varying the optical length of the cavity and the second pair of electrodes cooperating with the crystal so as to form, in cooperation with the birefringent plate, the electro-optical means forming the spectral filter.

8. Device according to claim 3, wherein it further includes a means for slanting the birefringent plate with respect to the optical axis of the cavity.

9. Device according to claim 6, wherein it further includes a means for slanting the birefringent plate with respect to the optical axis of the cavity.

10. Device according to claim 7, wherein it further includes a means for slanting the birefringent plate with respect to the optical axis of the cavity.

11. Means according to claim 1, wherein the device for reflecting the light emitted by the source is a film able to reflect this light and formed on the birefringent element which, in the cavity, is most distant from the source.

12. Device according to claim 1, wherein the source is a semiconductor laser whose face, which is on the side of the reflecting means, is treated by an anti-reflective coating.

* * * * *